(12) United States Patent
Gilbey et al.

(10) Patent No.: US 10,289,994 B2
(45) Date of Patent: May 14, 2019

(54) METHOD OF ASSOCIATING A CUSTOMERS MOBILE COMPUTER DEVICE WITH AN ORDER FOR GOODS AND/OR SERVICES TAKEN BY A WAITER IN A MERCHANTS VENUE

(71) Applicant: MASTERCARD ASIA/PACIFIC PTE LTD., Singapore (SG)

(72) Inventors: Benjamin Charles Gilbey, Singapore (SG); Vijin Venugopalan, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 257 days.

(21) Appl. No.: 15/264,906

(22) Filed: Sep. 14, 2016

(65) Prior Publication Data

US 2017/0083899 A1    Mar. 23, 2017

(30) Foreign Application Priority Data

Sep. 17, 2015    (SG) .............................. 10201507756R (51) Int. Cl.
    *G06Q 20/32*    (2012.01)
    *G06Q 20/20*    (2012.01)
    (Continued)

(52) U.S. Cl.
    CPC ......... *G06Q 20/3224* (2013.01); *G06Q 20/20* (2013.01); *G06Q 20/327* (2013.01);
    (Continued)

(58) Field of Classification Search
    USPC .......................................................... 705/15
    See application file for complete search history.

(56) References Cited

U.S. PATENT DOCUMENTS

| 7,058,611 B2 | 6/2006 | Kranzley et al. |
| 2012/0143752 A1* | 6/2012 | Wong .................. G06Q 20/105 |
| | | 705/41 |

(Continued)

OTHER PUBLICATIONS

"EMV Payment Tokenisation Specification—Technical Framework" (version 1.0, Mar. 2014) of EMV Co., available at www.emvco.com, Mar. 2014, 84 pages.

(Continued)

*Primary Examiner* — Garcia Ade
(74) *Attorney, Agent, or Firm* — Buchanan Ingersoll & Rooney PC (57) ABSTRACT

A method of associating a customer's mobile computer device with an order for goods and/or services taken by a waiter on a waiter's mobile computer device in a merchant's venue, including the steps of: (a) receiving data representing a customer's order for goods and/or services; (b) generating an order identification code; (c) generating a total amount payable for the goods and/or services ordered; (d) pairing the waiter's device with the customer's mobile computer device, said pairing resulting in generation of a pairing identification code; (e) receiving from the customer's device a device identification code; and (f) generating a transaction identification code based on (i) the order identification code; (ii) the device identification code and/or the pairing identification code; and (iii) the total amount payable; and (g) sending data representing the customer's order and the transaction identification code to a point of sale system to prepare the order.

20 Claims, 10 Drawing Sheets

(51) Int. Cl.
    *G06Q 30/06*     (2012.01)
    *G06Q 20/36*     (2012.01)
    *G06Q 50/12*     (2012.01)

(52) U.S. Cl.
    CPC .............. *G06Q 20/36* (2013.01); *G06Q 30/06* (2013.01); *G06Q 50/12* (2013.01)

(56) References Cited

U.S. PATENT DOCUMENTS

| | | |
|---|---|---|
| 2013/0191227 A1 | 7/2013 | Pasa et al. |
| 2013/0297504 A1 | 11/2013 | Nwokolo et al. |
| 2015/0080021 A1* | 3/2015 | Bietz .................. H04B 1/3877 455/456.1 |

OTHER PUBLICATIONS

MasterCard SecureCode, Merchant Implementation Guide, Jun. 17, 2014, 72 pages.

\* cited by examiner

METHOD OF ASSOCIATING A CUSTOMERS MOBILE COMPUTER DEVICE WITH AN ORDER FOR GOODS AND/OR SERVICES TAKEN BY A WAITER IN A MERCHANTS VENUE

FIELD OF THE INVENTION

The present invention relates to a method of associating a customer's mobile computer device with an order for goods and/or services taken by a waiter in a merchant's venue.

BACKGROUND OF INVENTION

The nightclub industry, for example, faces unique issues in the areas of:
(1) beverage ordering;
(2) management of payments; and
(3) delivery of paid orders to customers.

Specifically, waiters in nightclubs have difficulties connecting the order of beverages and payment of those beverages to a specific individual or group when that group may be highly mobile within the environment.

The transactions associated with the purchase of each round of drinks will typically involve the following steps:
(1) the customer flags down a passing waiter who, in turn, takes the customer's order;
(2) the waiter moves to the preparation area (also referred to as the "Bar") and gives the customer's order to the bartender to prepare the drinks;
(3) the waiter takes the drinks prepared by the bartender back to the customer and presents him or her with the bill for payment;
(4) the customer gives the waiter cash or a credit card to cover the bill and the waiter goes to a point of sale (POS) machine to process the payment;
(5) the waiter returns to the customer with payment articles, such as:
   (a) a payment receipt;
   (b) change from cash provided; and/or
   (c) credit card slip.

With regard to steps 3 and 5, it is possible that the customer has moved location within the venue. Customer movement can make the waiter's job more difficult and reduce their efficiency and/or job satisfaction. This may lead to job dissatisfaction and higher turnover in staff. It may also lead to patron dissatisfaction and, in the long term, fewer patrons returning to the bar. Further, any undue delay caused by the waiter not being able to find the customer can lead to a reduction in customer satisfaction. This may ultimately lead to the customer not returning to the venue.

The above described difficulties with a waiter being able to find a customer are more pronounced when the venue:
(a) is busy;
(b) has a large floor area;
(c) is pocketed;
(d) has more than one level; and/or
(e) encourages movement of the crowd.

It may also be difficult for a waiter to find the customer in the venue where the waiter was not involved with the previous interaction with the customer. That is, it may be difficult for the waiter to deliver the drinks where the waiter did take the original order. As such, it is usually the case that the same waiter will need to complete each one of above steps 1 to 5 for each round of drinks purchased. It may not be efficient or cost effective for the same waiter to complete all 5 steps for each round of drinks.

It is generally desirable to improve customer experiences with making payments for goods and services. It is also generally desirable to improve merchant and/or merchant employee experiences with making payments.

It is generally desirable to overcome or ameliorate one or more of the above described difficulties, or to at least provide a useful alternative.

SUMMARY OF INVENTION

In accordance with the invention, there is provided a method of associating a customer's mobile computer device with an order for goods and/or services taken by a waiter on a waiter's mobile computer device in a merchant's venue, including the steps of:
(a) receiving data representing a customer's order for goods and/or services;
(b) generating an order identification code;
(c) generating a total amount payable for the goods and/or services ordered;
(d) pairing the waiter's device with the customer's mobile computer device, said pairing resulting in generation of a pairing identification code;
(e) receiving from the customer's device a device identification code; and
(f) generating a transaction identification code based on:
   (i) the order identification code;
   (ii) the device identification code and/or the pairing identification code; and
   (iii) the total amount payable; and
(g) sending data representing the customer's order and the transaction identification code to a point of sale system to prepare the order.

Preferably, the method further including the step of sending the transaction identification code to the customer's device to effect payment of the total amount payable.

Preferably, the transaction identification code received by the customer's device invokes an electronic wallet to make the payment via the merchant system.

Preferably, the method further including the steps of:
(a) receiving data representing a current position of the customer's device; and
(b) storing the current position so that the customer device can be later located by a waiter.

In accordance with the invention, there is also provided a method of locating a customer's mobile computer device so as to deliver an order of goods and/or services made by the customer by performing the above-mentioned steps, including the steps of:
(a) receiving data representing a location of a customer's device associated with the order;
(b) generating data representing a location of the customer's device in the merchant's venue; and
(c) displaying said data on a display of the waiter's device.

Preferably, said data representing a location of the customer's device includes a floor plan of the merchant's venue with indicia indicating a location of the customer's device.

In accordance with the invention, there is also provided a non-transitory computer readable storage medium embodying thereon a program of computer readable instructions which, when executed by one or more processors of a waiter's mobile computer device in communication with a merchant system, cause the device to perform a method of associating a customer's mobile computer device with an order for goods and/or services taken by a waiter in a merchant's venue, including the steps of:

(a) receiving data representing a customer's order for goods and/or services;
(b) generating an order identification code;
(c) generating a total amount payable for the goods and/or services ordered;
(d) pairing the waiter's device with the customer's mobile computer device, said pairing resulting in generation of a pairing identification code;
(e) receiving from the customer's device a device identification code; and
(f) generating a transaction identification code based on:
  (i) the order identification code;
  (ii) the device identification code and/or the pairing identification code; and
  (iii) the total amount payable; and
(g) sending data representing the customer's order and the transaction identification code to a point of sale system to prepare the order.

Preferably, the method further including the step of sending the transaction identification code to the customer's device to effect payment of the total amount payable.

Preferably, the transaction identification code received by the customer's device invokes an electronic wallet to make the payment via the merchant system.

Preferably, the method further including the steps of:
(a) receiving data representing a current position of the customer's device; and
(b) storing the current position so that the customer device can be later located by a waiter.

In accordance with the invention, there is also provided a non-transitory computer readable storage medium embodying thereon a program of computer readable instructions which, when executed by one or more processors of a waiter's mobile computer device in communication with a merchant system, cause the device to perform a method of locating a customer's mobile computer device to deliver an order of goods and/or services taken by performing the steps claimed in any one of claims 12 to 18, including the steps of:
(a) receiving data representing a location of a customer's device associated with the order;
(b) generating data representing a location of the customer's device in the merchant's venue; and
(c) displaying said data on a display of the waiter's device.

Preferably, said data representing the location of the customer's device includes a floor plan of the merchant's venue with indicia indicating a location of the customer's device.

BRIEF DESCRIPTION OF THE DRAWINGS

Preferred embodiments of the invention are hereafter described, by way of non-limiting example only, with reference to the accompanying drawings, in which.

DETAILED DESCRIPTION OF PREFERRED EMBODIMENTS OF THE INVENTION

Figure 1:
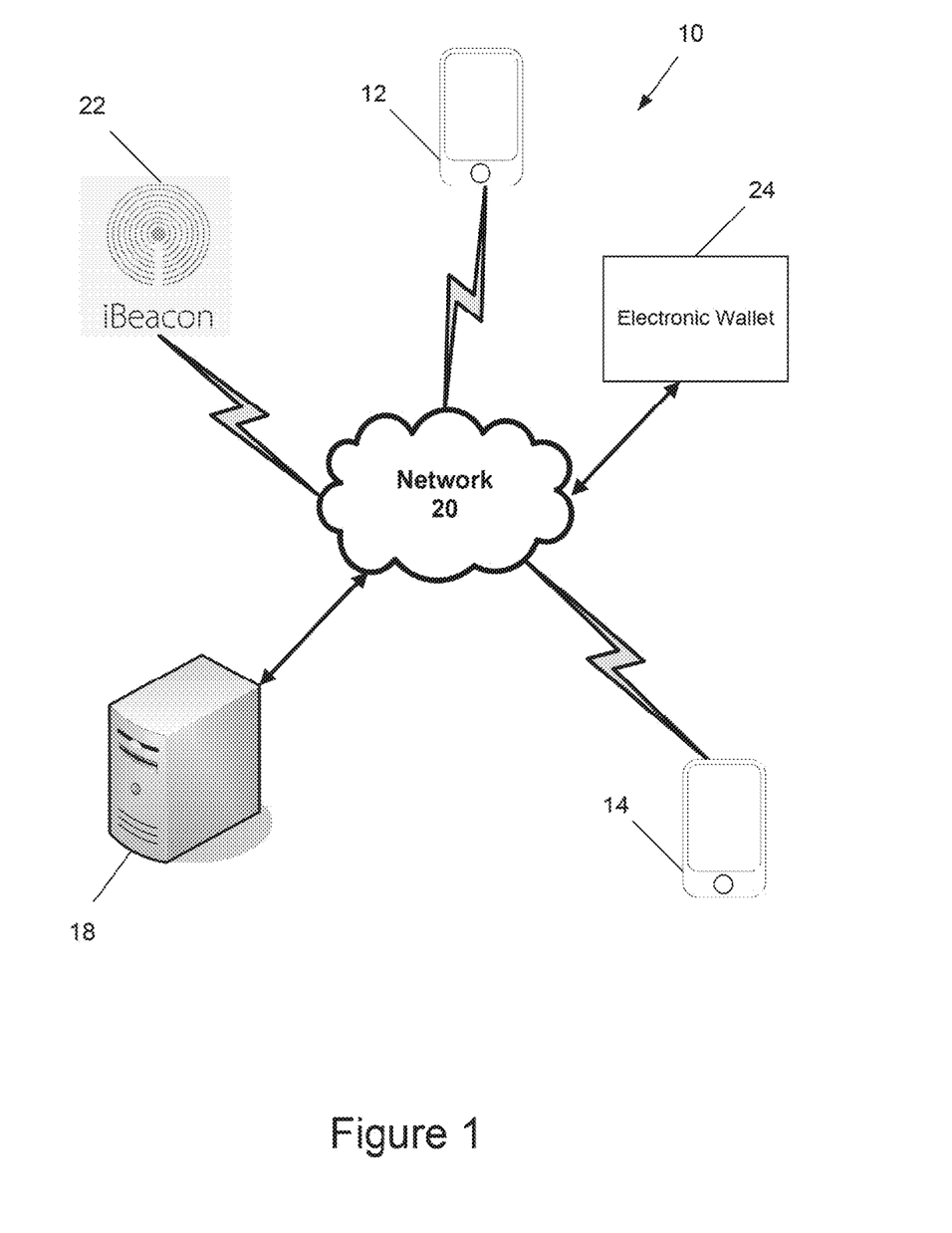
FIG. 1 is a schematic diagram of a system for associating a customer's mobile computer device with an order for goods and/or services taken by a waiter in a merchant's venue.
Figure 2:
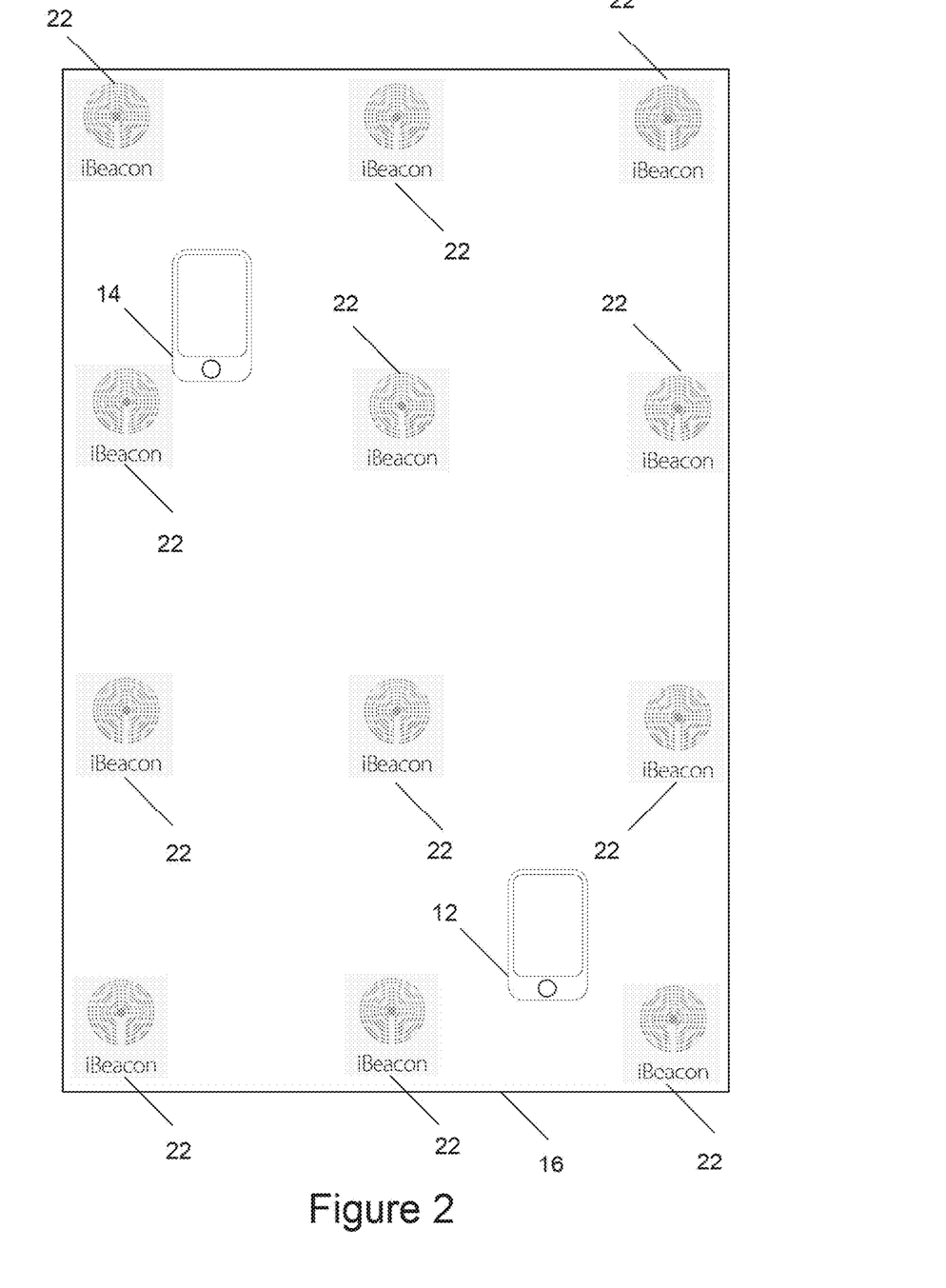
FIG. 2 is a schematic diagram of the merchant's venue of the system shown in FIG. 1.

The system 10 shown in FIGS. 1 and 2 is used to perform one or more of the following operations:
(1) using a waiter's mobile computer device 12 to take an order for a customer and to associate that order with the customer's mobile computer device 14; and
(2) using the waiter's device 12 to locate the customer's device 14 in the merchant's venue 16 so as to deliver the order.

To facilitate the above-described operations, the system 10 includes:
(1) a merchant system 18 in communication with the waiter's mobile computer device 12 and the customer's mobile device 14 over a communication network 20 (for example, a WiFi network); and
(2) a plurality of transmitters 22 located around a merchant's venue 16, one or more of the transmitters 22 being in communication with the customer's device 14.

Although the primary function of the transmitters 22 is transmission, in some embodiments the transmitters 22 can also be capable of receiving signals.

The system 10 ameliorates one or more of the difficulties of the prior art by:
(1) reducing the number of times a waiter needs to be in physical communication with a customer for effecting the steps of:
  (a) taking an order;
  (b) making payment; and
  (c) delivering the order;
(2) making finding customers in a venue to deliver an order more efficient; and/or
(3) eliminating the need for the waiter who took an order to also deliver the same order to the customer.

The Waiter's Device 12

Figure 3:
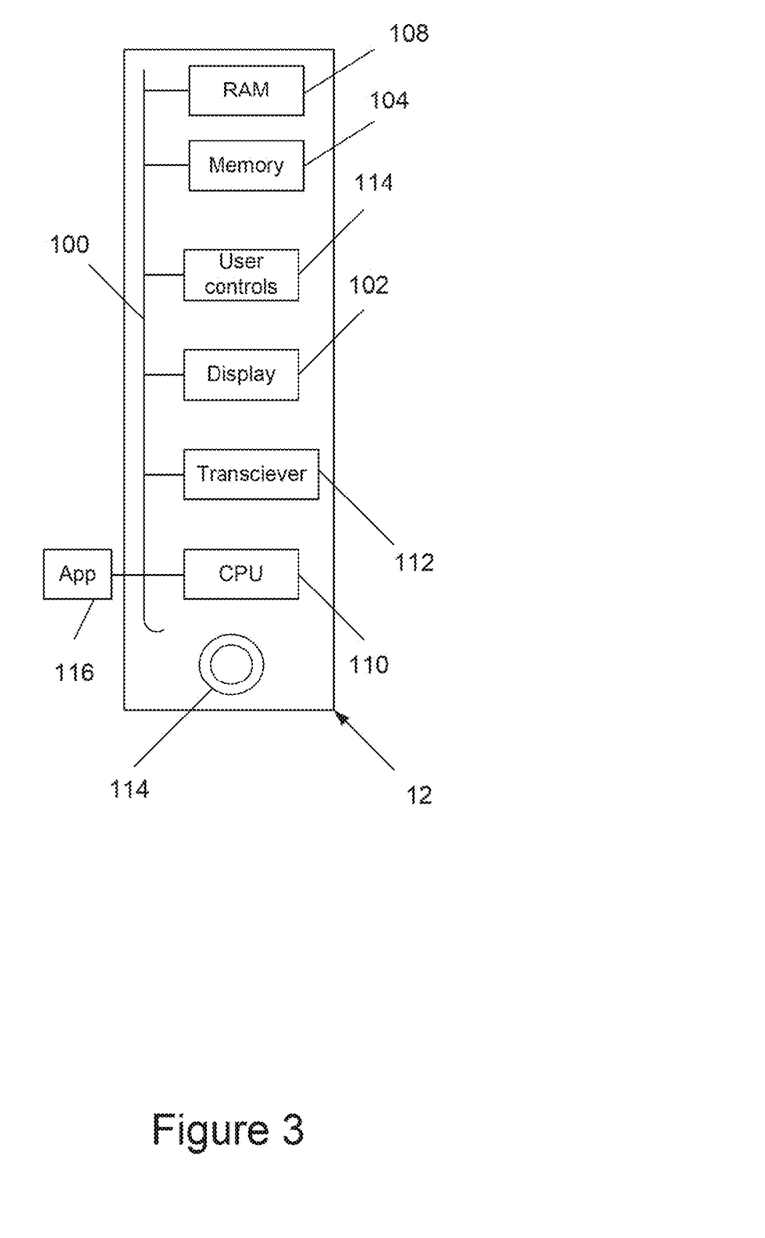
FIG. 3 is a schematic diagram showing components of a waiter's device of the system shown in FIG. 1.

The waiter's mobile device 12 is a handheld computer device such as a smart phone or a PDA such as one manufactured by Apple™, LG™, HTC™, Research In Motion™, or Motorola™. The mobile device 12 is preferably a mobile computer such as a tablet computer. An exemplary embodiment of the mobile device 12 is shown in FIG. 3. As shown, the device 12 includes the following components in electronic communication via a bus 100:
1. a display 102;
2. non-volatile memory 104;
3. random access memory ("RAM") 108;
4. N processing components 110;
5. a transceiver component 112 that includes N transceivers; and
6. user controls 114.

Although the components depicted in FIG. 3 represent physical components, FIG. 3 is not intended to be a hardware diagram. Thus, many of the components depicted in FIG. 3 may be realized by common constructs or distributed among additional physical components. Moreover, it is certainly contemplated that other existing and yet-to-be developed physical components and architectures may be utilized to implement the functional components described with reference to FIG. 3.

The display 102 generally operates to provide a presentation of content to a user, and may be realized by any of a variety of displays (e.g., CRT, LCD, HDMI, micro-projector and OLED displays). And in general, the non-volatile memory 104 functions to store (e.g., persistently store) data and executable code including code that is associated with the functional components of a browser component and the Waiter App 116. In some embodiments, for example, the non-volatile memory 104 includes bootloader code, modem software, operating system code, file system code, and code to facilitate the implementation of one or more portions of the Waiter App 116 as well as other components well known to those of ordinary skill in the art that are not depicted for simplicity.

In many implementations, the non-volatile memory 104 is realized by flash memory (e.g., NAND or ONENAND memory), but it is certainly contemplated that other memory types may be utilized as well. Although it may be possible to execute the code from the non-volatile memory 104, the executable code in the non-volatile memory 104 is typically loaded into RAM 108 and executed by one or more of the N processing components 110.

The N processing components 110 in connection with RAM 108 generally operate to execute the instructions stored in non-volatile memory 104 to effectuate the functional components. As one of ordinarily skill in the art will appreciate, the N processing components 110 may include a video processor, modem processor, DSP, graphics processing unit (GPU), and other processing components.

The transceiver component 112 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

As above-mentioned, the following processes are performed by the system 10:
(1) using a waiter's mobile computer device 12 to take an order for a customer and to associate that order with the customer's mobile computer device 14; and
(2) using the waiter's device 12 to locate the customer's device 14 in the merchant's venue 16 so as to deliver the order.

Each one of these processes are below described in further detail.

1. Associating an Order with Customer's Mobile Device

Figure 4A:
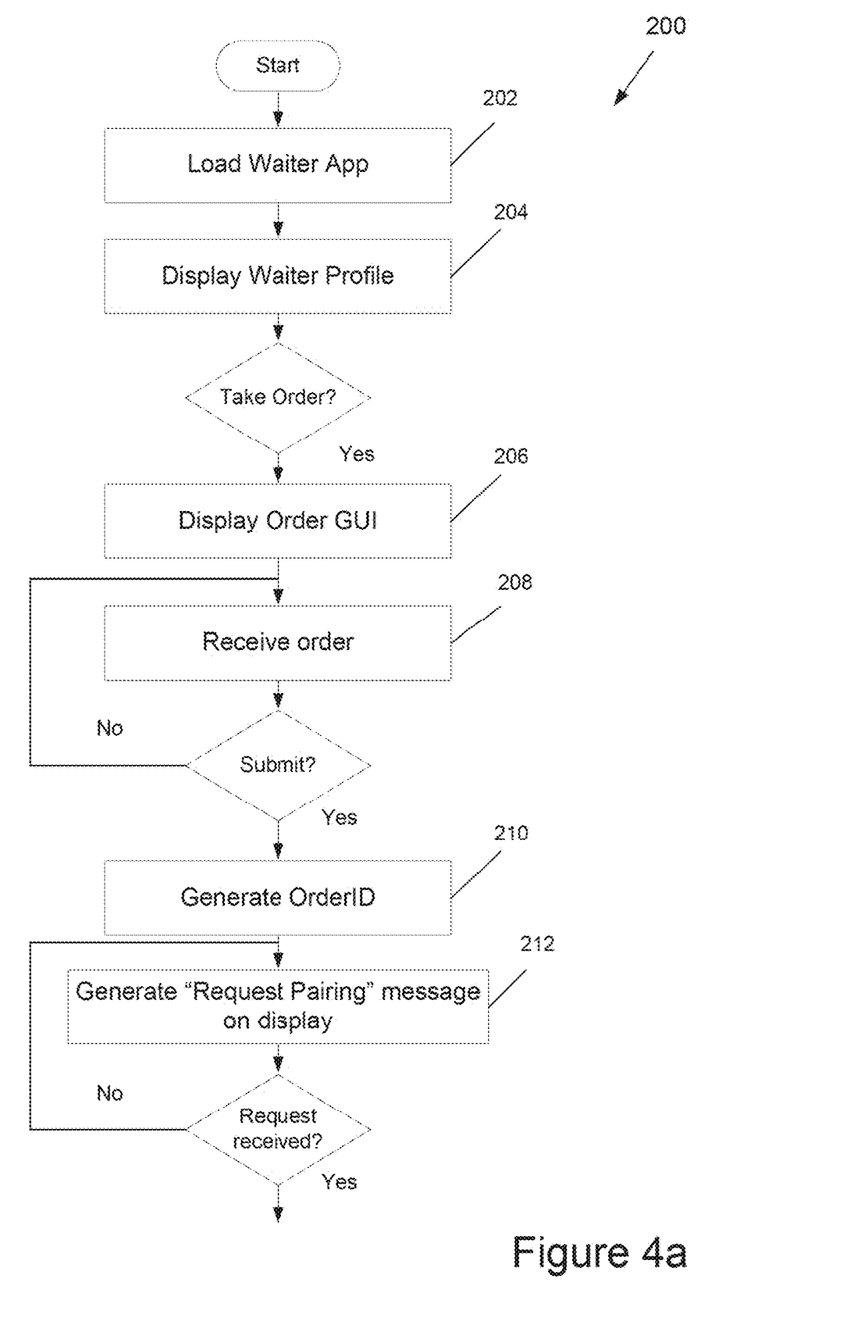
FIGS. 4*a* and 4*b* are flow diagrams showing steps performed by an application program being executed on the waiter's device shown in FIG. 3.
Figure 4B:
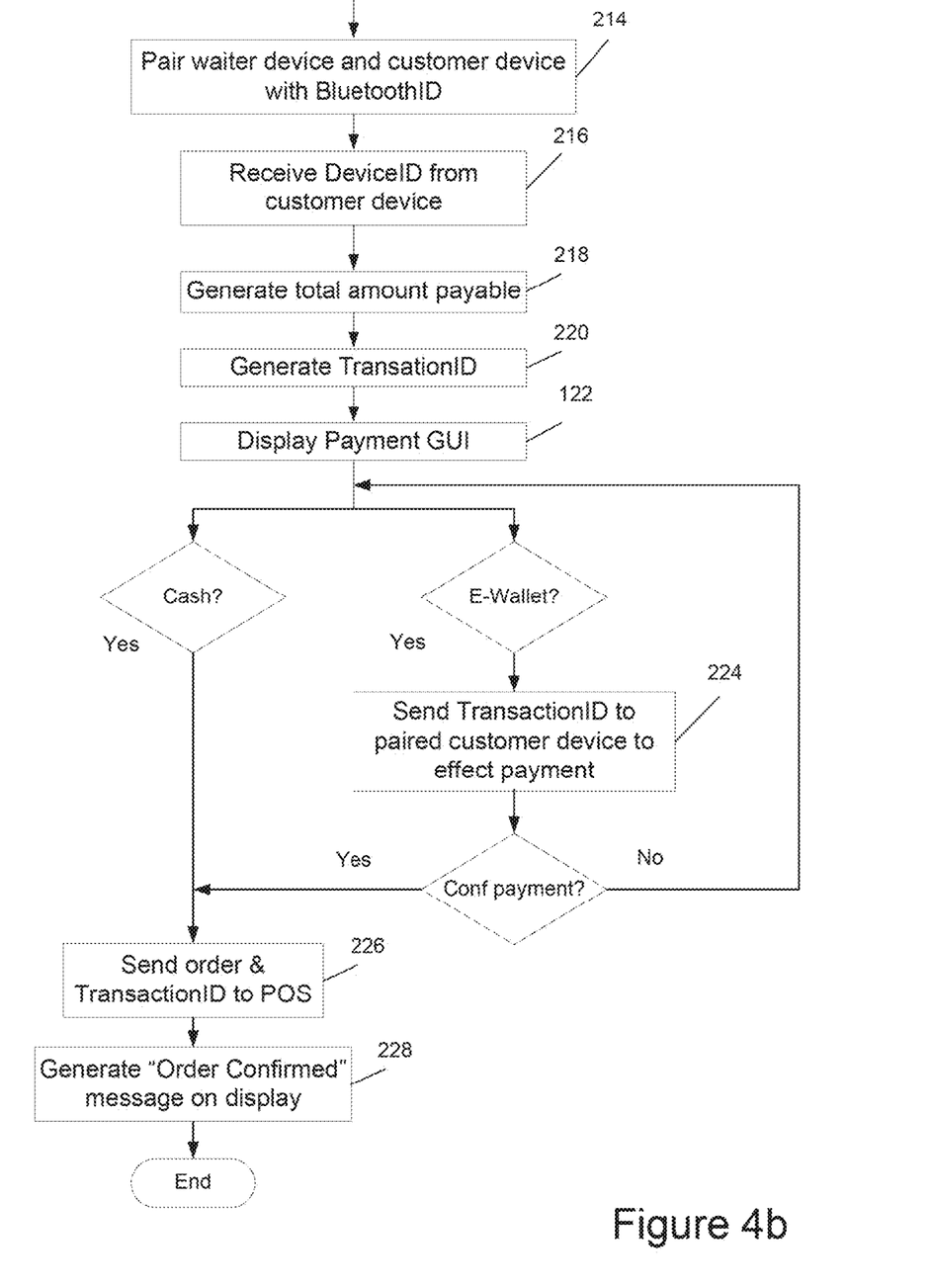

FIGS. 4a and 4b show the method steps 200 performed by an application program 116 stored in non-transient data storage 104 on the waiter's device 12.

a. Taking the Order

Figure 5A:
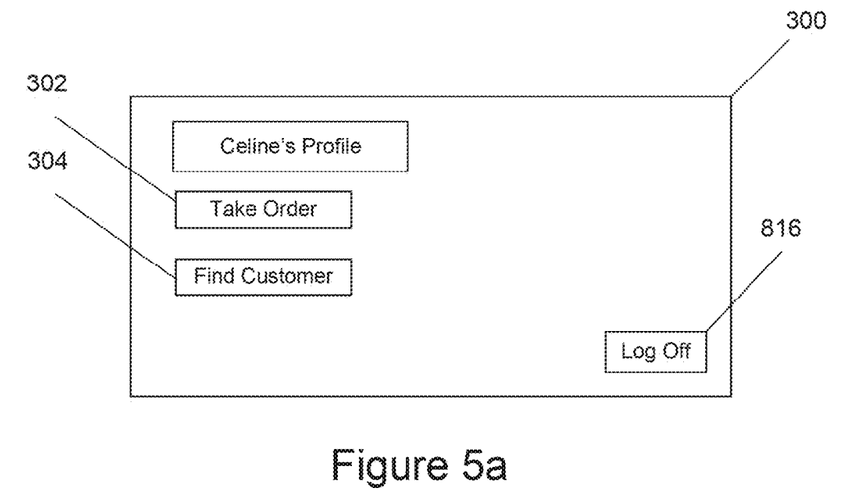
FIGS. 5*a* and 5*b* are graphical user interfaces generated by the application program being executed by the waiter's device shown in FIG. 3.

In the normal course of events, the waiter approaches a customer to take a drinks order, for example. The waiter's device loads, at step 202, the Waiter App 116 on his or her mobile computer device 12 which displays, at step 204, the "Profile" GUI 300 for the waiter shown in FIG. 5a. The waiter selects the "Take Order" function button 302 and the Waiter App 16 loads, at step 206, the "Order Form" GUI 350 shown in FIG. 5b including, amongst other things, a listing 352 of the drink items 354 offered by the merchant.

Figure 5B:
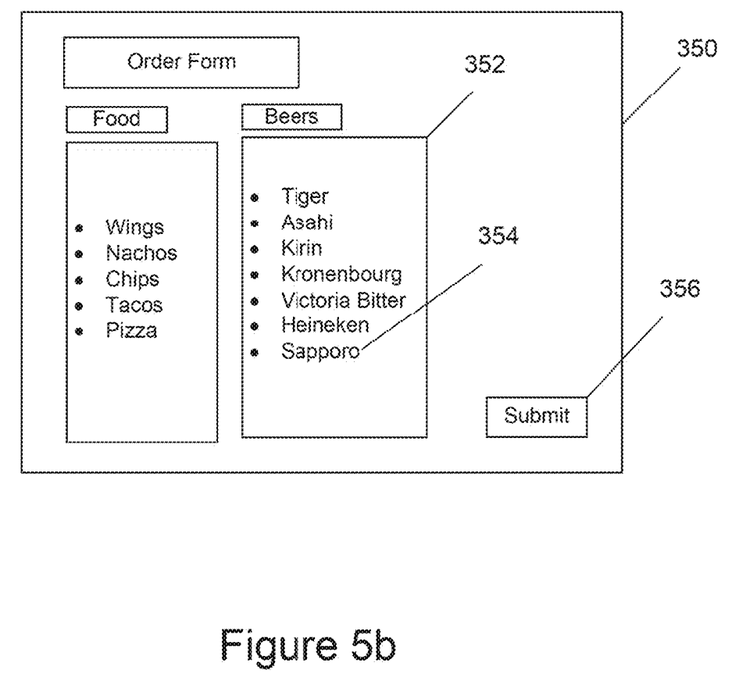

The waiter asks the customer for his or her order and then enters, at step 208, each item 354 into the "Order Form" GUI 350. This can be done by selecting the item 354 shown in the "Order Form" GUI 350 and entering an associated quantity. Alternatively, this can be done by selecting the item 354 shown in the "Order Form" GUI 350 a number of times, where each selection increments the order number by one.

When all order items have been entered by the waiter, the waiter selects the "Submit" function button 356 and the Waiter App 116 generates, at step 210, an Order identification code (OrderID).

b. Pairing the Waiter and Customer Devices

The Waiter App 116 then generates, at step 212, a "Request Pairing" message on the display 102 of the waiter's device 12. The waiter then asks the customer to request pairing on his or her device using a pairing communications protocol. For example, the pairing request is made using Bluetooth™. The process 200 can use other protocols to pair the devices 12, 14. However, for simplicity of description, the preferred embodiments of the invention are below described, by way of non-limiting example, with reference Bluetooth™ alone.

The customer is able to see the waiter's device 12 listed on his or her device 14. To effect the pairing, at step 214, the user selects the waiter's device 12 and a pairing identification code is generated (hereafter referred to as BluetoothID). The waiter's device 12 then receives, at step 216, the customer's device identification code (hereafter referred to as DeviceID). The device identification code is a unique identifier for the customer's device 14 and may be, for example, a UDID in the case of an Apple iPhone or iPad device. The customer device 14 and the waiter device 12 are then paired.

The above steps are described by way of reference to the pairing being actioned by the customer. Of course, the pairing could happen in reverse. That is, the waiter may request pairing with the customer's device 14.

The Waiter App 116 then generates, at step 218, a total amount payable. This is done by totaling the price of the items ordered and then adding any applicable tax and/or service charge. Pricing information for respective items may be stored locally on the waiter's device 12 and updated periodically by retrieving records from a database of the merchant system 18 (via either a push or pull mechanism), or may be retrieved dynamically from the merchant system 18 at the time of ordering. Advantageously, dynamic retrieval of the pricing information may enable offers (e.g. happy hour prices) to be applied automatically to the customer's order on a time-dependent basis. Price information may be adjusted at the merchant system 18 according to a schedule (e.g., 8 pm to 9 pm every Monday to Thursday) or on an ad hoc basis by a user having write access to the database of merchant system 18.

The Waiter App 116 then generates, at step 220, a transaction identification code (hereafter referred to as the TransactionID). The TransactionID includes:

(a) the OrderID;

(b) the DeviceID and/or the BluetoothID; and (c) the total amount payable.

The TransactionID identifies the unique customer device 14 for a specific OrderID.

c. Payment

Figure 6:
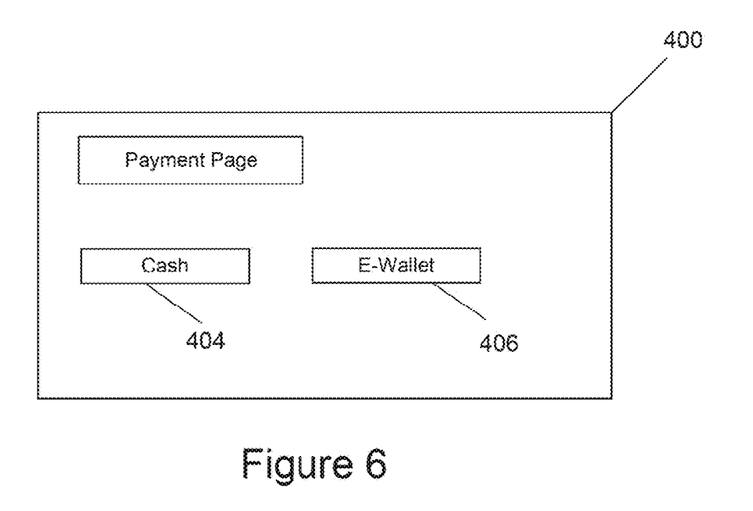
FIG. 6 is a graphical user interfaces generated by the application program being executed by the waiter's device shown in FIG. 3.

The Waiter App 116 then generates the Payment GUI 400 shown in FIG. 6 which include the following function buttons:

(i) E-Wallet 402; and (ii) Cash or Credit Card 406.

i. E-Wallet

If the waiter selects the "E-Wallet" function button 402, then the Waiter App 116 sends, at step 224, the Transaction ID to the paired customer device 14 via the Bluetooth™ connection.

On receipt of the TransactionID, the mobile wallet 24 on the customer's device 14 is invoked and the customer selects a payment wallet to be used to settle the TransactionID. The customer selects, from the payment wallet, a payment instrument and settles the full payment amount. In particular, a wallet application on the customer device 14 generates payment data which is transmitted to the merchant system 18. The payment data comprises the amount of the payment, a tokenized version of the PAN of the selected payment instrument, the expiry date of the payment instrument, and other information required to generate an authorization request for a transaction (for example, formatted according to the ISO8583 standard) as will be understood by those skilled in the art. The merchant system 18 then submits an authorization request to, for example, a payment service provider (PSP) or the merchant's acquirer in known fashion.

Many methods of conducting secure electronic commerce transactions are known in the art. For example, U.S. Pat. No. 7,058,611 describes in some detail a method involving the SET™ protocol which facilitates secure payment card transactions over the Internet. The disclosure of U.S. Pat. No. 7,058,611 in its entirety is hereby incorporated into this specification for all purposes by way of reference.

Further, U.S. patent application Ser. No. 13/209,312 generally discloses a phone-based electronic wallet that provides transactions across multiple channels of commerce. The electronic wallet described therein can be used for point of sale payments, remote mobile payments and/or web based payments. The disclosure of U.S. patent application Ser. No. 13/209,312 in its entirety is hereby incorporated into this specification for all purposes by way of reference.

Further still, U.S. patent application Ser. No. 13/835,088 generally discloses a system of tokenizing sensitive cardholder payment information for use in cashless transactions. The disclosure of U.S. patent application Ser. No. 13/835,088 in its entirety is hereby incorporated into this specification for all purposes by way of reference. Tokenization is also described in detail in the document "EMV Payment Tokenisation Specification—Technical Framework" (version 1.0, March 2014) of EMV Co., which is hereby incorporated into this specification for all purposes by reference. The EMV Payment Tokenisation Specification is available at www.emvco.com.

U.S. patent application Ser. No. 13/746,904 entitled "System and method to enable a network of digital wallets", includes a federated network of electronic wallets. The disclosure of U.S. patent application Ser. No. 13/746,904 in its entirety is hereby incorporated into this specification for all purposes by way of reference.

Verified by Visa Acquirer and Merchant Implementation Guide (http://usa.visa.com/download/merchants/verified-by-visa-acquirer-merchant-implementation-guide.pdf) describes a 3D secure online program designed to make Internet purchase transactions safer by authenticating a cardholder's identity at the time of purchase, before the merchant submits an authorization request. This document, in its entirety, is hereby incorporated into this specification for all purposes by way of reference.

MasterCard Secure Code https://www.mastercard.us/content/dam/mccom/en-us/documents/SMI_Manual.pdf describes another 3D secure online program. This document, in its entirety, is hereby incorporated into this specification for all purposes by way of reference.

It is anticipated that the customer device 14 can effect payment by way of any suitable electronic/online wallet system, including any one of the above systems.

The Waiter App waits for confirmation that the authorization request has been approved and then, at step 226, sends the order and the TransactionID to the point of sale (POS) of the merchant system 18 so that the order can be prepared by the bar tender.

ii. Cash or Credit Card

If the waiter selects the "Cash or Credit Card" function button 404, then the Waiter App 116 sends, at step 226, the order and the TransactionID to the point of sale (POS) of the merchant system 18 so that the order can be prepared by the bar tender.

The waiter then returns to the POS to deliver the cash or the card to effect payment for the transaction.

2. Locating the Customer's Device

Figure 7:
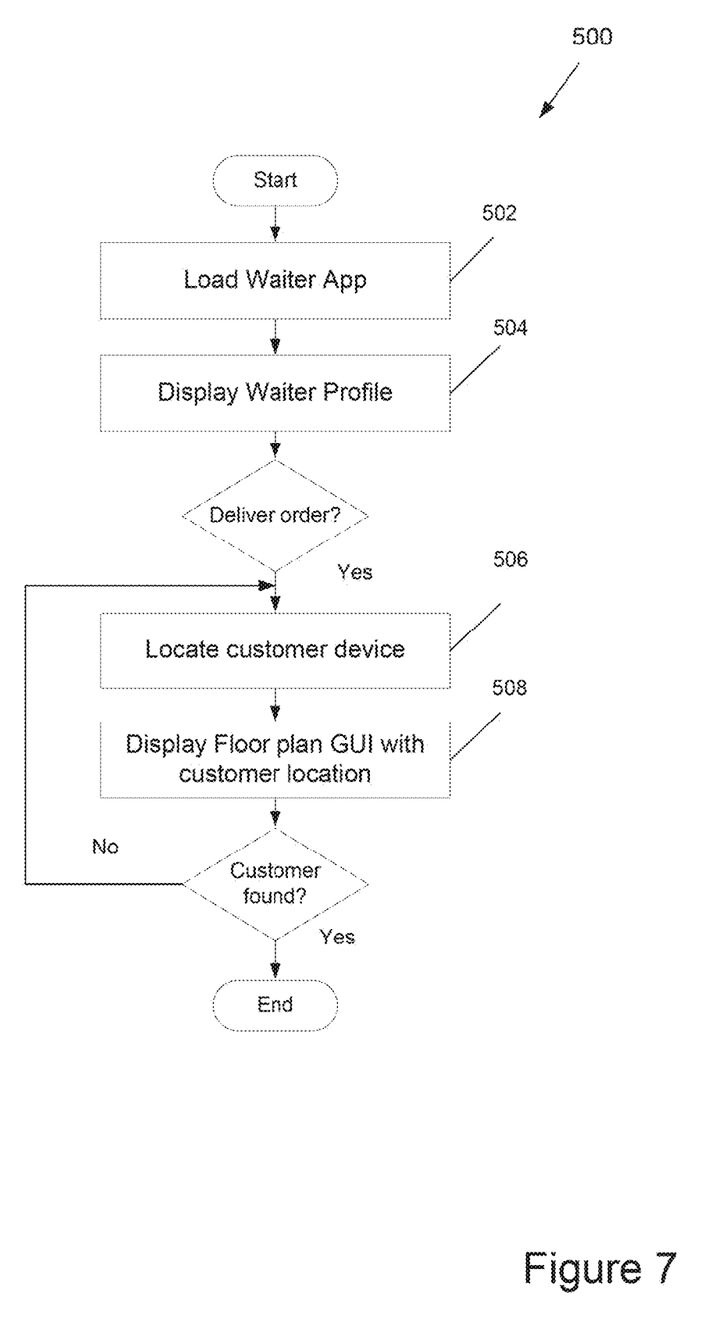
FIG. 7 is a flow diagram showing steps performed by an application program being executed on the waiter's device shown in FIG. 3.

When the order is ready, the waiter collects the order from the bar and performs the steps 500 shown in FIG. 7 to deliver the order to the customer.

The waiter loads, at step 502, the Waiter App 116 on his or her device 12. The Waiter App 116 generates, at step 504, the GUI 300 shown in FIG. 5a on the display 102. The waiter then executes the "Find Customer" function button 304 and the Waiter App 116 then scans, at step 506 using a BLE signal, for the customer's device 14, using the BluetoothID generated during the pairing process described above. Alternatively, the Waiter App 116 may poll the network of transmitters 22 to locate the customer device 14.

Figure 8:
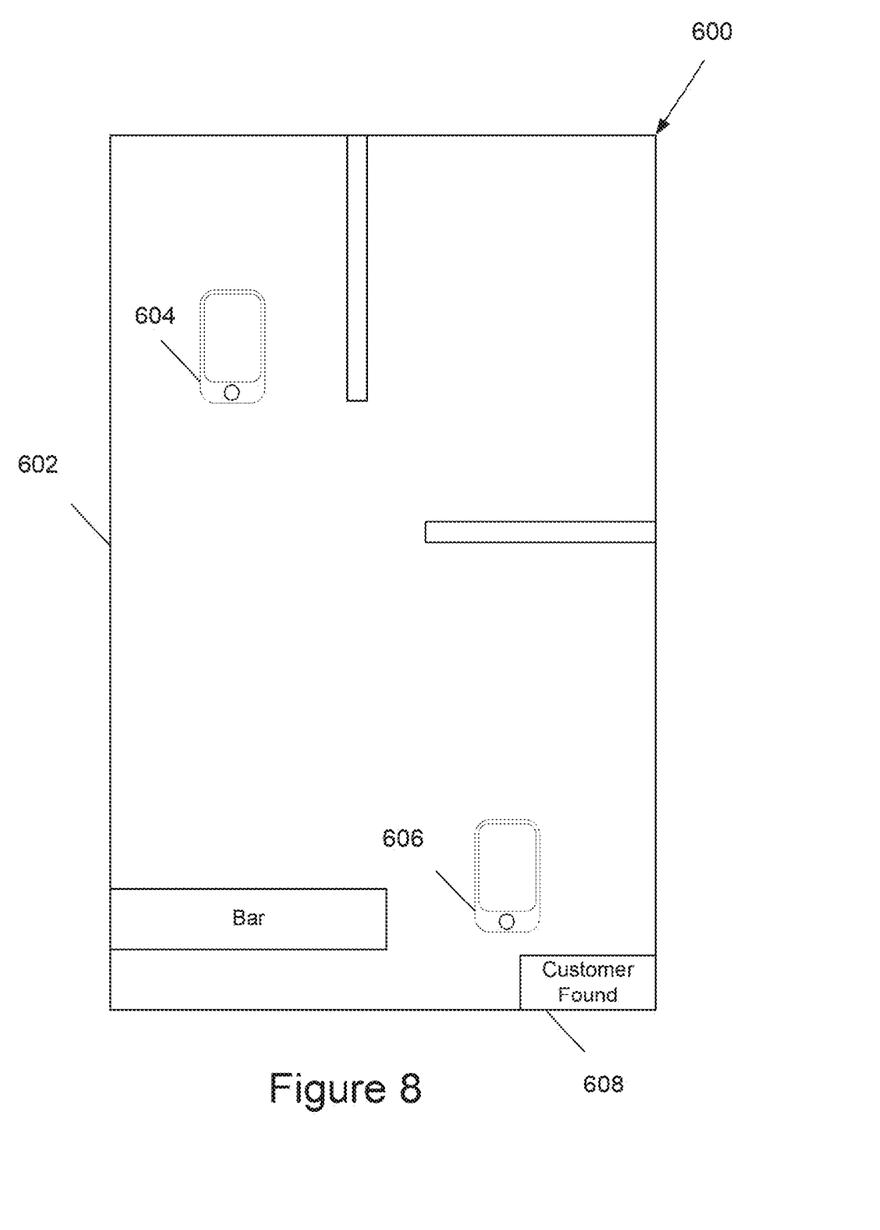
FIG. 8 is a graphical user interfaces generated by the application program being executed by the waiter's device shown in FIG. 3.

The Waiter App 116 generates, at step 508, the GUI 600 shown in FIG. 8 which shows:

(a) a floor plan 602 of the merchant's venue;

(b) indicia 604 indicating a location of the customer's device 14; and (c) indicia 606 indicating a location of the waiter's device 12.

The Waiter App 116 will continue to repeat steps 506 and 508 until the waiter executes the "Customer Found" function button 608.

If a network of transmitters 22 is used, they preferably form part of a Bluetooth™ Low Energy Beacon Network. For example, the transmitters 22 may transmit data according to the iBeacon protocol of Apple, Inc or the Eddystone format of Google, Inc. In this embodiment, the step of polling is effected using the unique DeviceID or the BluetoothID for the customer through the TransactionID associated with the order.

For example, the customer's device 14 may receive BLE signals from transmitters 22 and a merchant application executing on the customer's device 14 (the counterpart to the Waiter App 116) may periodically determine, based on signal strengths (RSSI) for example, distance data indicative of distances of the customer device 14 to respective transmitters 22, together with identifiers of the transmitters 22. The distance data may be periodically transmitted, via network 20, to the merchant system 18 and associated with the TransactionID associated with the order. The Waiter App 116 may request, over network 20, current distance data from the merchant system 18 corresponding to the TransactionID, and may then display, on floor plan 602 based on the distance data, the location of the transmitter 22 which is closest to the customer's device 14. Alternatively, the Waiter App 116 may compute, based on the distance data, a more precise location for the customer's device 14.

The BLE beacons 22 installed in the merchant's venue 16, may pinpoint the customers device BluetoothID down to a radius of approximately 1 m enabling the waiter to easily locate the customer even if the customer has moved from the original ordering location.

The Bluetooth beacons 22 are transmitters that use Bluetooth Low Energy 4.0 to broadcast signals that can be detected by compatible or smart devices. These transmitters 22 can be powered by batteries or a fixed power source such as a USB adapter. When a smart device is in a beacon's proximity, the beacon will automatically recognise it and will be able to interact with that device.

The iBeacon, for example, transmitters 22 use Bluetooth 4.0 technology, which can send specific information to nearby devices 12, 14 based on location. The Bluetooth Beacons 22 are dispersed within and around the venue 16 to broadcast their signal.

The Beacons 22 can pinpoint if a customer device 14 is in range of its signal and their app/Passbook pass determines what to do when they inside that range.

Bluetooth beacons 22 deliver a Bluetooth data package by radio waves at regular intervals. The information in the Bluetooth data package transmitted by a beacon 22 includes:
  (a) beacon ID; and
  (b) latitude-longitude.

If the customer and waiter devices 14,12 are iBeacon enabled, then they may themselves constitute iBeacons 22.

Merchant System 700

Figure 9:
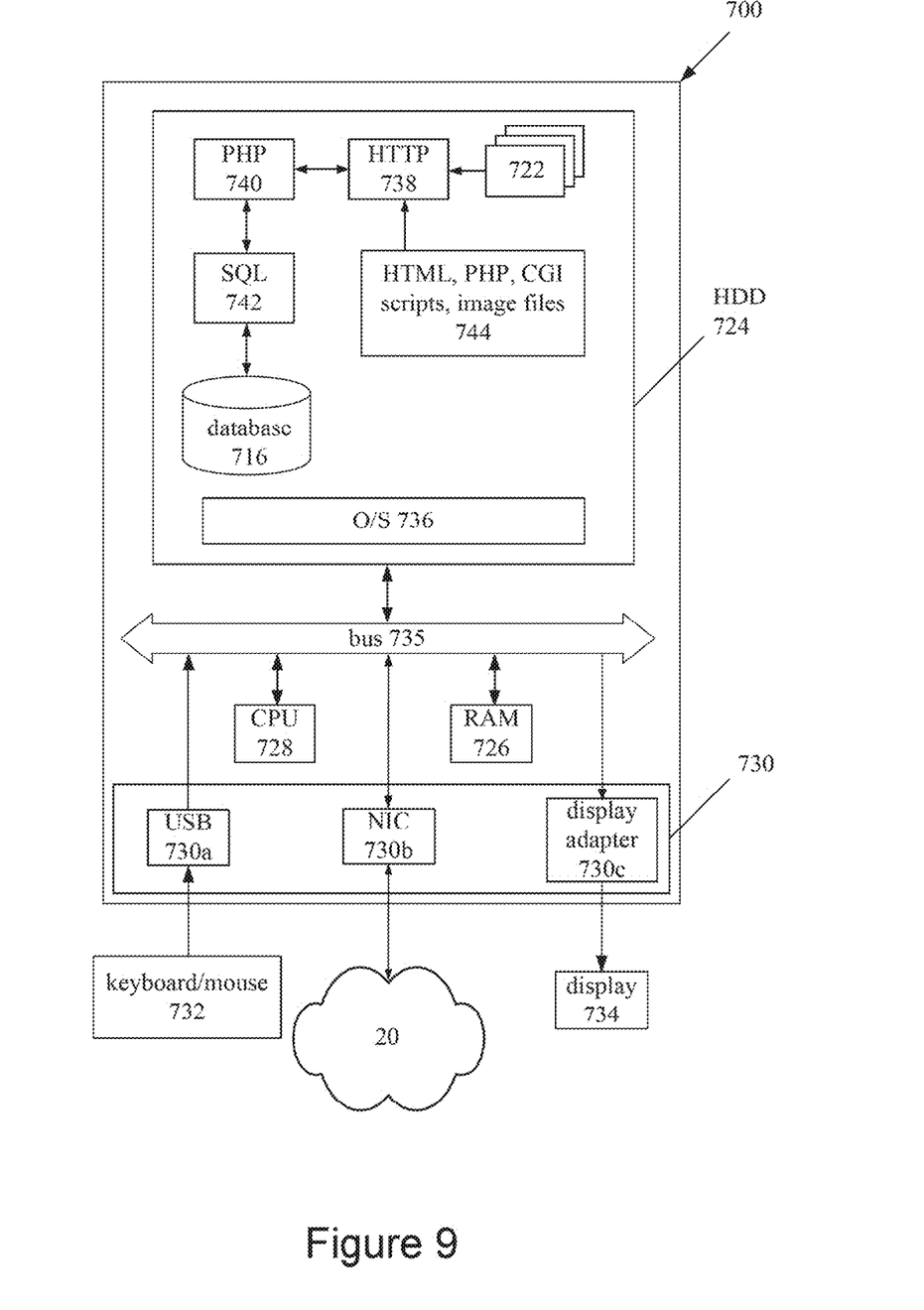
FIG. 9 is a schematic diagram showing components of a merchant system of the system shown in FIG. 1.

The merchant system 700 is provided by a server in communication with a database 716, as shown in FIG. 9. The system 700 is able to communicate with user equipment 12, 14, 22, 24 over a communications network 20 using standard communication protocols.

The components of the merchant system 700 can be configured in a variety of ways. The components can be implemented entirely by software to be executed on standard computer server hardware, which may comprise one hardware unit or different computer hardware units distributed over various locations, some of which may require the communications network 20 for communication. A number of the components or parts thereof may also be implemented by application specific integrated circuits (ASICs) or field programmable gate arrays.

In the example shown in FIG. 9, the merchant system 700 is a commercially available server computer system based on a 32 bit or a 64 bit Intel architecture, and the processes and/or methods executed or performed by the computer system 700 are implemented in the form of programming instructions of one or more software components or modules 722 stored on non-volatile (e.g., hard disk) computer-readable storage 724 associated with the computer system 700. At least parts of the software modules 722 could alternatively be implemented as one or more dedicated hardware components, such as application-specific integrated circuits (ASICs) and/or field programmable gate arrays (FPGAs).

The computer system 700 includes at least one or more of the following standard, commercially available, computer components, all interconnected by a bus 735:
1. random access memory (RAM) 726;
2. at least one computer processor 728, and
3. external computer interfaces 730:
    a. universal serial bus (USB) interfaces 730a (at least one of which is connected to one or more user-interface devices, such as a keyboard, a pointing device (e.g., a mouse 732 or touchpad),
    b. a network interface connector (NIC) 730b which connects the computer system 700 to a data communications network, such as the Internet 20; and
    c. a display adapter 730c, which is connected to a display device 734 such as a liquid-crystal display (LCD) panel device.

The computer system 700 includes a plurality of standard software modules, including:
1. an operating system (OS) 736 (e.g., Linux or Microsoft Windows);
2. web server software 738 (e.g., Apache, available at http://www.apache.org);
3. scripting language modules 740 (e.g., personal home page or PHP, available at http://www.php.net, or Microsoft ASP); and
4. structured query language (SQL) modules 742 (e.g., MySQL, available from http://www.mysql.com), which allow data to be stored in and retrieved/accessed from an SQL database 716.

Together, the web server 738, scripting language 740, and SQL modules 742 provide the computer system 700 with the general ability to allow users of the Internet 20 with standard computing devices 12, 14, 22 24 equipped with standard web browser software to access the computer system 700 and in particular to provide data to and receive data from the database 716. It will be understood by those skilled in the art that the specific functionality provided by the system 700 to such users is provided by scripts accessible by the web server 738, including the one or more software modules 722 implementing the processes performed by the computer system 700, and also any other scripts and supporting data 744, including markup language (e.g., HTML, XML) scripts, PHP (or ASP), and/or CGI scripts, image files, style sheets, and the like.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagrams of the processes of the computer system 700 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computer system 700 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Many modifications will be apparent to those skilled in the art without departing from the scope of the present invention The reference to any prior art in this specification is not, and should not be taken as, an acknowledgment or any form of suggestion that the prior art forms part of the common general knowledge.

In this specification and the claims that follow, unless stated otherwise, the word "comprise" and its variations, such as "comprises" and "comprising", imply the inclusion of a stated integer, step, or group of integers or steps, but not the exclusion of any other integer or step or group of integers or steps.

References in this specification to any prior publication, information derived from any said prior publication, or any known matter are not and should not be taken as an acknowledgement, admission or suggestion that said prior publication, or any information derived from this prior publication or known matter forms part of the common general knowledge in the field of endeavour to which the specification relates.

The invention claimed is:

1. A method of associating a first mobile computer device with a second mobile computer device within a venue, said method including the steps of:
   (a) receiving, via a graphical user interface of the first mobile computer device, data representing a customer's order for goods and/or services;
   (b) in response to receiving said data, generating, by the first mobile computer device, an order identification code;
   (c) generating, by the first mobile computer device, a total amount payable for the goods and/or services ordered;
   (d) generating, by the first mobile computer device, a pairing request;
   (e) transmitting, by the first mobile computer device, the generated pairing request to the second mobile computer device;
   (f) generating, by the first mobile computer device, a pairing identification code;
   (g) receiving, by the first mobile computer device, from the second mobile computer device a device identification code, wherein said device identification code is unique to the second mobile computer device;
   (h) in response to the generation of the pairing identification code and the receiving of the device identification code, pairing the first mobile computer device with the second mobile computing device;
   (i) generating, by the first mobile computer device, a transaction identification code on a basis of (1) the order identification code, (2) the device identification code and/or the pairing identification code, and (3) the total amount payable;
   (j) transmitting, by the first mobile computer device, data representing the customer's order and the transaction identification code to a point of sale system; and
   (k) locating, by the first mobile computer device, the second mobile computer device within the venue and relative to the first mobile computer device by at least one of (1) scanning, via a signal, for the second mobile computer device using the generated pairing identification code, and (2) polling a network of transmitters installed throughout the venue.

2. The method claimed in claim 1, the method further including the step of sending, by the first mobile computer device, the transaction identification code to the second mobile computer device to effect payment of the total amount payable.

3. The method claimed in claim 2, wherein the transaction identification code received by the second mobile computer device invokes an electronic wallet to make the payment via a merchant system.

4. The method claimed in claim 1, the method further including the steps of:
   (a) receiving, by the first mobile computer device, data representing a current position of the second mobile computer device; and
   (b) storing the current position so that the second mobile computer device can be later located.

5. The method claimed in claim 1, wherein the step of pairing the first mobile computer device with the second mobile computer device is effected using a wireless communication protocol.

6. The method claimed in claim 5, wherein the wireless communication protocol is Bluetooth™.

7. The method claimed in claim 6, wherein the pairing identification code is a Bluetooth identification code.

8. The method claimed in claim 1, wherein the locating of the second mobile computer device includes receiving data representing a location of the second mobile computer device, wherein the method further includes:
   generating, by the first mobile computer device, data representing a location of the customer's device in the venue; and
   generating a graphical user interface displaying data representing a location of the second mobile computer device relative to the first mobile computer device.

9. The method claimed in claim 8, wherein said data representing the location of the second mobile computer device includes a floor plan of the venue with indicia indicating the location of the second mobile computer device relative to the first mobile computer device.

10. The method claimed in claim 8, further including a step of transmitting a request to the second mobile computer device for location information, said request including the device identification code and/or the pairing identification code.

11. A non-transitory computer readable storage medium embodying thereon a program of computer readable instructions which, when executed by one or more processors of a first mobile computer device, in a merchant venue, in communication with a merchant system, cause the first mobile computer device to perform the steps of:
   (a) receiving data representing a customer's order for goods and/or services;
   (b) generating, in response to receiving said data, an order identification code;
   (c) generating a total amount payable for the goods and/or services ordered;
   (d) generating a pairing request;
   (e) transmitting the generated pairing request to the second mobile computer device;
   (f) generating a pairing identification code;

(g) receiving, from the second mobile computer device, a device identification code, wherein said device identification code is unique to the second mobile computer device;

(h) in response to the generation of the pairing identification code and the receiving of the device identification code, pairing the first mobile computer device with the second mobile computing device;

(i) generating a transaction identification code on a basis of (1) the order identification code, (2) the device identification code and/or the pairing identification code, and (3) the total amount payable;

(j) transmitting data representing the customer's order and the transaction identification code to a point of sale system; and (k) locating, by the first mobile computer device, the second mobile computer device within the venue and relative to the first mobile computer device by at least one of (1) scanning, via a signal, for the second mobile computer device using the generated pairing identification code, and (2) polling a network of transmitters installed throughout the venue.

12. The storage medium claimed in claim 11, further causing the first mobile computer device to perform the step of sending the transaction identification code to the second mobile computer device to effect payment of the total amount payable.

13. The storage medium claimed in claim 12, wherein the transaction identification code received by the second mobile computer device invokes an electronic wallet to make the payment via the merchant system.

14. The storage medium claimed in claim 11, further causing the first mobile computer device to perform the steps of:

receiving data representing a current position of the second mobile computer device; and storing the current position so that the second mobile computer device can be later located.

15. The storage medium claimed in claim 11, wherein the step of pairing the first mobile computer device with the second mobile computer device is effected using wireless communication protocol.

16. The storage medium claimed in claim 15, wherein the wireless communication protocol is Bluetooth™.

17. The storage medium claimed in claim 16, wherein the pairing identification code is a Bluetooth identification code.

18. The non-transitory computer readable storage medium claimed in claim 12, wherein the locating of the second mobile computer device includes receiving data representing a location of the second mobile computer device associated wherein the non-transitory computer readable storage medium further causes the first mobile computer device to perform the steps of:

generating data representing a location of the second mobile computer device in the merchant venue; and generating a graphical user interface displaying data representing a location of the second mobile computer device relative to the first mobile computer device.

19. The storage medium claimed in claim 18, wherein said data representing the location of the second mobile computer device includes a floor plan of the merchant venue with indicia indicating a location of the second mobile computer device relative to the first mobile computer device.

20. The storage medium claimed in claim 18, further including the step of transmitting a request to the second mobile computer device for location information, said request including the device identification code and/or the pairing identification code.

\* \* \* \* \*